US010329788B2

(12) United States Patent
Jonah et al.

(10) Patent No.: US 10,329,788 B2
(45) Date of Patent: Jun. 25, 2019

(54) DRILLING RIG

(71) Applicant: Schlumberger Technology Corporation, Sugar Land, TX (US)

(72) Inventors: Kevin Bradley Jonah, Calgary (CA); Kevin Denness, Calgary (CA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/514,242

(22) PCT Filed: Aug. 7, 2015

(86) PCT No.: PCT/US2015/044291
§ 371 (c)(1),
(2) Date: Mar. 24, 2017

(87) PCT Pub. No.: WO2016/048458
PCT Pub. Date: Mar. 31, 2016

(65) Prior Publication Data
US 2017/0247902 A1     Aug. 31, 2017

Related U.S. Application Data

(60) Provisional application No. 62/054,513, filed on Sep. 24, 2014.

(51) Int. Cl.
*E04H 12/34* (2006.01)
*B60P 3/40* (2006.01)
(Continued)

(52) U.S. Cl.
CPC .............. *E04H 12/345* (2013.01); *B60P 3/40* (2013.01); *B62D 63/061* (2013.01); *E04H 12/10* (2013.01);
(Continued)

(58) Field of Classification Search
CPC ......... E04H 12/345; E04H 12/10; B60P 3/40; E21B 15/00; B62D 63/061
See application file for complete search history.

(56) References Cited

U.S. PATENT DOCUMENTS 7,182,163 B1 * 2/2007 Gipson .................... B60S 9/20
180/8.1
7,765,749 B2 * 8/2010 Palidis ..................... E21B 7/02
173/184

(Continued)

OTHER PUBLICATIONS

International Search Report and Written Opinion issued in International Patent Application No. PCT/US2015/044291 dated Dec. 28, 2015; 11 pages.

*Primary Examiner* — Patrick J Maestri

(57) ABSTRACT

A method of assembling a drilling rig may include aligning a trailer with a drilling rig support structure, the trailer carrying a mast and the drilling rig support structure including a step-down substructure. A first end of the mast may be positioned over the drilling rig support structure and arms may be extended from the mast to the drilling rig support structure so that the drilling rig support structure supports the first end of the mast. The mast may translate along a length of the drilling rig support structure. The mast may be coupled to the drilling rig support structure.

7 Claims, 11 Drawing Sheets

(51) Int. Cl.
  *E21B 7/02* (2006.01)
  *E21B 15/00* (2006.01)
  *B62D 63/06* (2006.01)
  *E04H 12/10* (2006.01)

(52) U.S. Cl.
  CPC .............. *E21B 7/02* (2013.01); *E21B 7/023* (2013.01); *E21B 15/00* (2013.01)

(56) References Cited

U.S. PATENT DOCUMENTS

| | | |
|---|---|---|
| 2005/0193645 A1 | 9/2005 | Barnes |
| 2011/0072737 A1 | 3/2011 | Wasterval |
| 2012/0047820 A1* | 3/2012 | Donnally ................ E21B 15/00 52/123.1 |
| 2013/0177375 A1* | 7/2013 | Crane .................... E02F 3/382 414/722 |

* cited by examiner

DRILLING RIG

CROSS-REFERENCE TO RELATED APPLICATIONS

The present application claims priority to U.S. Provisional Application 62/054,513 filed Sep. 24, 2014, the entirety of which is incorporated by reference.

TECHNICAL FIELD

Some embodiments described herein generally relate to drilling rig mast assemblies. Additional embodiments described herein generally relate to assembly and disassembly of drilling rig mast assemblies. Some embodiments herein relate to assembly and disassembly of drilling rig mast assemblies to facilitate transporting drilling rigs.

BACKGROUND

In the drilling of oil and gas wells, drilling rigs are used to create a well by drilling a borehole into the Earth's crust to reach oil and gas deposits. During the drilling process, as the depth of the borehole increases, so does the length and weight of the drill string. A drill string may include sections of drill pipe, a bottom hole assembly, and other tools for creating a well. The length of the drill string may be increased by adding additional sections of drill pipe as the depth of the borehole increases. Although a drill pipe section may come in any length, one common drill pipe section length is 30 feet.

A drilling mast or derrick may be used to support the weight of the drill string. The drilling mast or derrick may also accommodate additional sections of drill pipe as they are added to the drill string. To accommodate the weight of the drill string and to support the length of drill pipe that may be held above the ground, the mast or derrick may be strong and may be tall. The mast or derrick may also be heavy due to its strength and height.

While the drilling mast or derrick may support the weight of the drill string, the hoisting system, including drawworks, drilling line, and a pulley system, raises and lowers the drill string in and out of the borehole. The drawworks may include a rotating drum connected to a drive system. The drum may let out and reel in the drilling line that may pass through the pulley system. In the pulley system the drilling line threads through a crown block and traveling block (sometimes called a block and tackle) which increases the mechanical advantage of the system, and may allow the drawworks to move the drill string. The hoisting system may also be heavy due to the strength and power used to support and move the drill string.

A drilling rig may also include a substructure. The substructure may support the weight of the hoisting system and the mast or derrick and therefore may also be heavy. The substructure, like the hoisting system and mast or derrick, may be constructed of steel or other metal, may also distribute the weight of the drilling rig over a large area of the ground.

While some drilling rigs may be permanent structures that are erected and used at a single drilling site, some drilling rigs may be used to drill multiple wells. Drilling rigs that drill multiple wells may be transported from one drilling site to another.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one non-limiting embodiment, a method of assembling a drilling rig is disclosed. The method may include aligning a trailer with a drilling rig support structure and the drilling rig support structure including a step-down substructure. The trailer may carry a mast. A first end of the mast may be positioned over the drilling rig support structure and mast arms may be extended from the mast to the drilling rig support structure so that the drilling rig support structure supports the first end of the mast. The mast may translate along a length of the drilling rig support structure. The mast may also be coupled to the drilling rig support structure.

DETAILED DESCRIPTION

Figure 1:
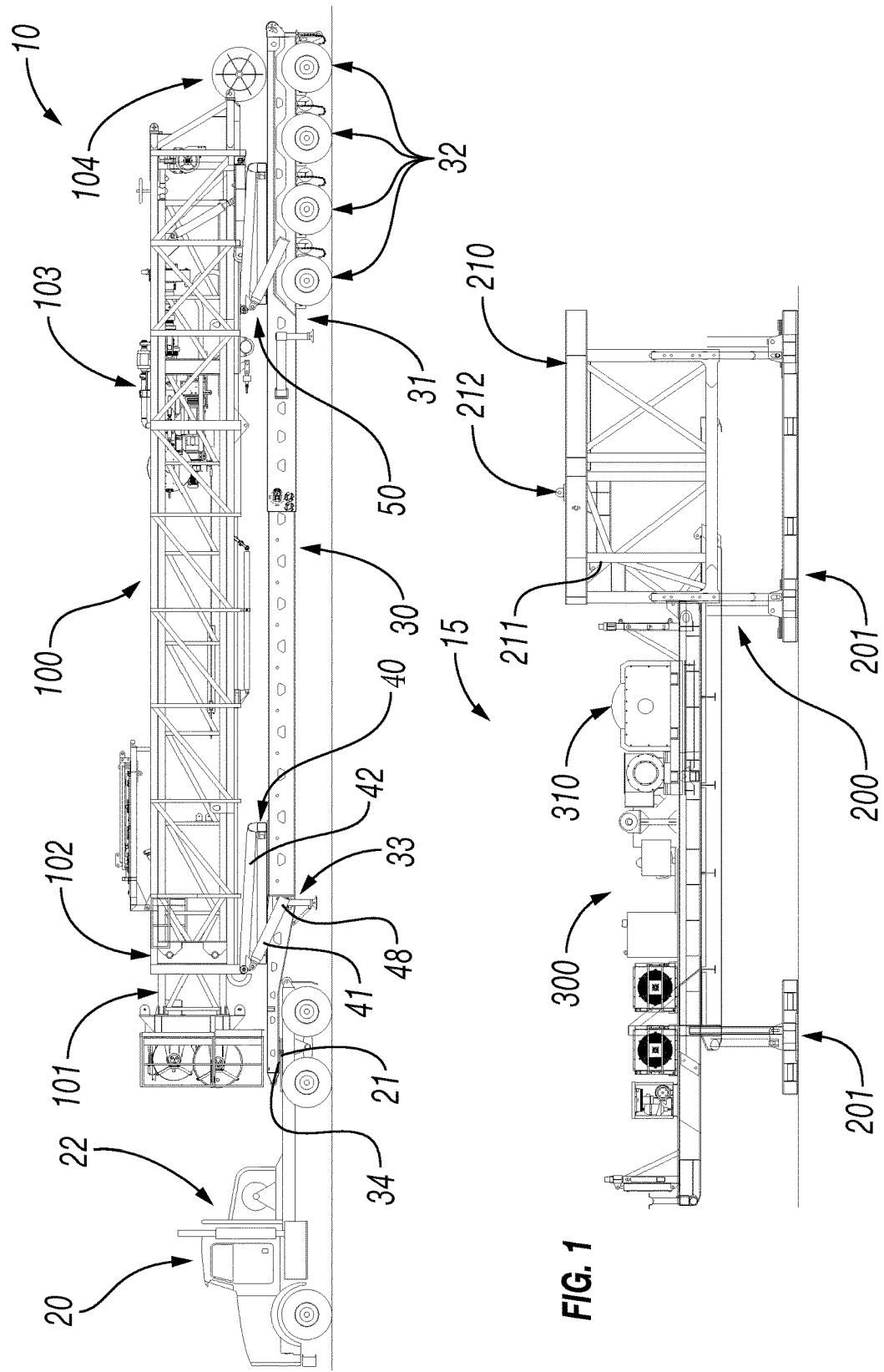
FIG. 1 depicts a drilling rig according to one or more embodiments disclosed herein.

FIGS. 1-7 depict an embodiment of a drilling rig 10. With reference to FIG. 1, the drilling rig 10 includes a mast 100, and a drilling rig support structure 15 which may include a substructure 200 and a drawworks skid 300. FIG. 1 also depicts a tractor unit 20 connected to a trailer 30.

The mast 100 may be telescoping or non-telescoping. A non-telescoping mast may be made of one or more mast lengths or sections that may be assembled and disassembled to change the length of the mast. A telescoping mast may also include one or more mast lengths or sections, with the mast links are joined together such that they may slide relative to one another in a telescoping configuration. The mast 100 depicted in FIG. 1 is a telescoping mast with an inner section 101 that telescopes into an interior of the outer section 102. The mast 100 also includes a top drive 103 and a drilling line spool 104. In some embodiments, the drilling line spool 104 may be coupled to the trailer 30 during transportation. In some embodiments the drilling line spool 104 may be coupled to the mast 100 during transportation. The mast 100 is depicted in FIG. 1 on the trailer 30 in a transportation ready configuration.

The trailer 30 may be a telescoping or other type of variable length trailer. A telescoping trailer may include two or more sections that may be slidingly engaged with each other. For example, the trailer 30 may include a rear section 31 slidingly engaged with a front section 33. The front section 33 may include coupling 34, such as a king pin, for coupling the trailer 30 to a tractor unit 20 via engagement with a coupling 21, which may be a turntable hitch. In some embodiments, the tractor unit 20 may be an oil field winch truck, a towing engine, a semi-truck, or other vehicle for transporting trailers. The tractor unit 20 includes a winch 22 and may sometimes be referred to as an oil filed winch truck or a winch truck. In some embodiments, the trailer 30 maybe a fixed length trailer or a two-part trailer which may include a dolly trailer or booster dolly trailer.

FIG. 1 also depicts the substructure 200. The substructure 200 is shown in FIG. 1 as a step-down substructure and may include a primary load path structure, a setback area, and a drill floor 210 which may include the rotary table. The substructure 200 may support the weight of the mast 100, drawworks skid 300, and a drill string during drilling operations. The substructure may be configured with structural support members that support the weight of the drilling rig 10 and distribute the weight over the ground via pads 201.

The drawworks skid 300 may include the drawworks 310, also called a hoist. The drawworks skid 300 may also include other support equipment used during the operation of the drilling rig 10. In some embodiments, a drilling rig 10 may not include a drawworks skid 300. In such embodiments, the drawworks 310 may be incorporated into the substructure 200 or may be located elsewhere on the drilling site.

FIG. 1 depicts the drilling rig 10 in a partially disassembled configuration. The mast 100 is shown in a collapsed, or telescoped-in, configuration on a trailer 30 attached to a tractor unit 20. The mast 100 is shown coupled to the trailer 30 via one or more lifts or other elevating device, for example, the trailer 30 includes a front bunk 40 and a rear bunk 50, both of which may be hydraulically actuated lifts. The front bunk 40 may be coupled to the front section 33 of the trailer 30, while the rear bunk 50 may be coupled to the rear section 31 of the trailer 30. In the depicted configuration, the substructure 200 is assembled, the drawworks skid 300 is loaded onto the substructure 200, and the mast 100 is either ready for assembly onto the drawworks skid 300 and substructure 200 or is ready for transportation to another drill site.

FIGS. 1-7 also depict a process for using a drilling rig and will be discussed in order and as though they depict a process for unloading a mast 100 from the trailer 30 and attaching the mast 100 to the substructure 200. In a reverse order, the figures depict a process for disconnecting the mast 100 from the substructure 200 and loading the mast 100 onto the trailer 30.

Figure 2:
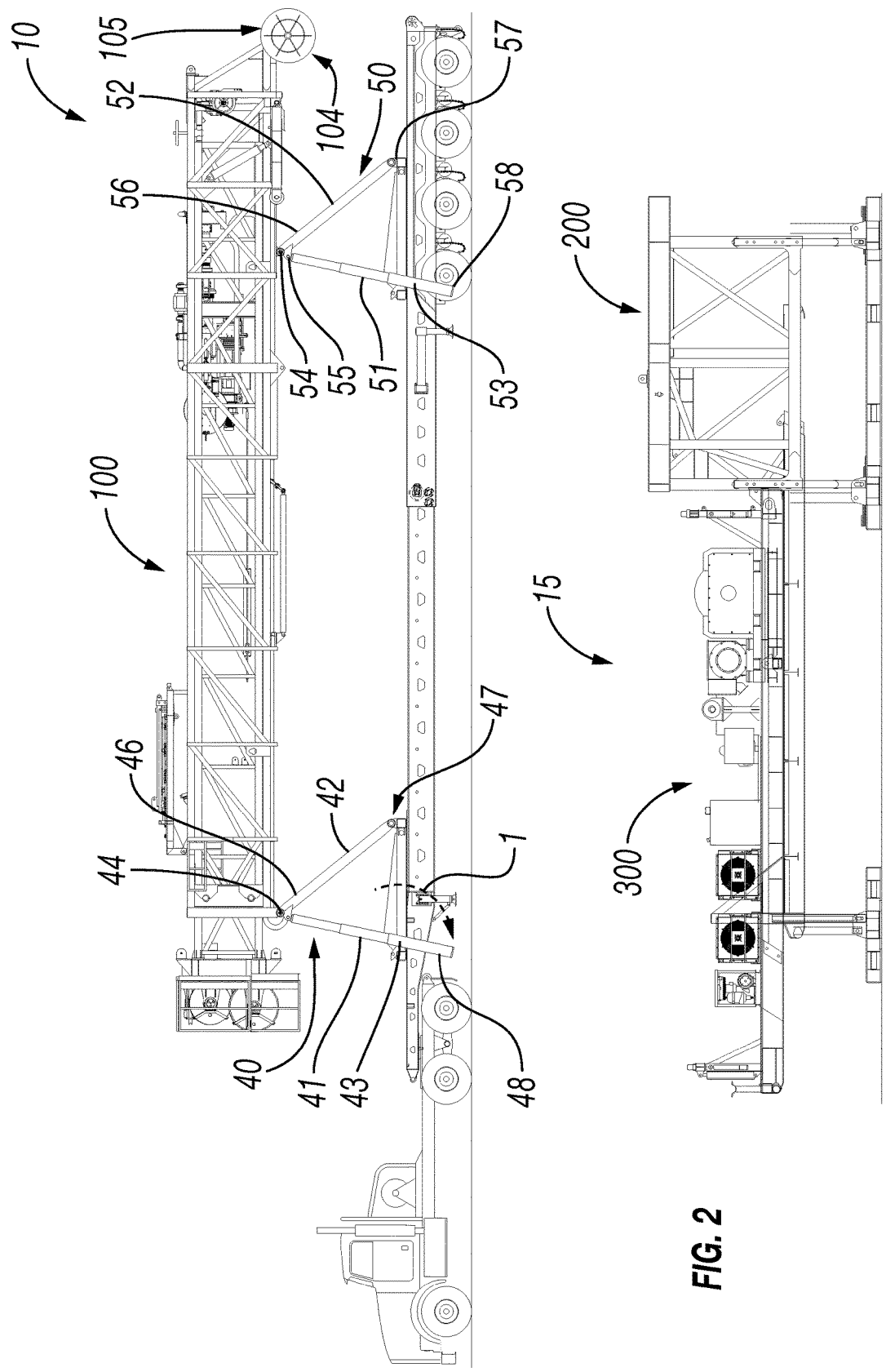
FIG. 2 depicts a drilling rig according to one or more embodiments disclosed herein.

FIG. 2 depicts an embodiment of a process for using a drilling rig with the front bunk 40 and rear bunk 50 supporting the mast 100 in an elevated position. The front bunk 40 and rear bunk 50 may be attached to the mast 100 via mast couplings 44, 54. The mast couplings 44, 54 may be a pin and aperture assembly. For example, the mast 100 may have apertures that correspond to apertures in the front bunk 40 and rear bunk 50. Pins may be placed through and first aperture in the mast 100 and a corresponding aperture in the front bunk 40 and a second aperture in the mast 100 with a corresponding aperture in the rear bunk 50 to couple the mast 100 to the trailer 30. In some embodiments, one or more of the mast couplings 44, 54 may be a king pin and turntable hitch with the kingpin attached to the mast 100 and the turntable hitch attached to the front bunk 40 and rear bunk 50. In some embodiments, the couplings 44, 54 may be any other coupling or coupling system configured to couple the mast to the trailer, for example, the may be bolts, hard pins, or a saddle clamp.

The front bunk 40 and rear bunk 50 may also include lifting assemblies 41, 51 and support assembly 42, 52. In some embodiments, the front bunk 40, rear bunk 50, or other lifts, elevating devices, or actuator mechanisms disclosed herein may be mechanical, electrical, or electromechanical actuators and may actuate via an associated control system or manually, for example, through the use of a hand winch. An example of a mechanical actuator is lead screw and nut.

The lifting assemblies 41, 51, may have first ends 45, 55 rotatably coupled to first ends 46, 56 of the support assemblies 42, 52. Second ends 47, 57 of the support assembly 42, 52 may be rotatably coupled to the trailer 30. Second ends 48, 58 of the lifting assemblies 41, 51 may also be rotatably coupled to the trailer 30. In some embodiments, one or more of the support assemblies 42, 52 and lifting assemblies 41, 51 may be coupled at a distance from their respective ends 45, 46, 47, 48, 55, 56, 57, 58. For example, the lifting assemblies 41, 51, depicted in FIG. 2 are coupled to the trailer 30 with a coupling 43, 53 at a distance from the second ends 48, 58 of the lifting assemblies 41, 51.

By pinning the lifting assemblies 41, 51 to the trailer 30 at a distance from the second ends 48, 58 the lifting assemblies 41, 51 may rotate during extension. For example, in a lowered position, see FIG. 1, the lifting assembly 41 is in a horizontal position and parallel to the support assembly 42 with the second end 48 not extending below the trailer 30. When the front bunk 40 transitions to a raised position, for example as shown in FIG. 2, the lifting assembly 41 may rotate in a direction 1 to a more vertical position. In the more vertical position the second end 48 of the lifting assembly 41 extends below the trailer 30. By coupling the lifting assembly 41 at a distance from the second end 48, the second end 48 may not extend below the trailer while in a refracted position which may provide for greater ground clearance during transportation of the trailer 30 and mast 100.

The drilling line spool 104 may be heavy and therefore to facilitate moving the drilling line spool 104 from the trailer 30 to the drawworks skid 300, an operator may couple the drilling line spool 104 to the mast 100. For example, as shown in FIG. 2, the drilling line spool 104 is coupled to mast mount point 105 and the front bunk 40 and rear bunk 50 may lift the drilling line spool 104 when they lift the mast 100.

Figure 3:
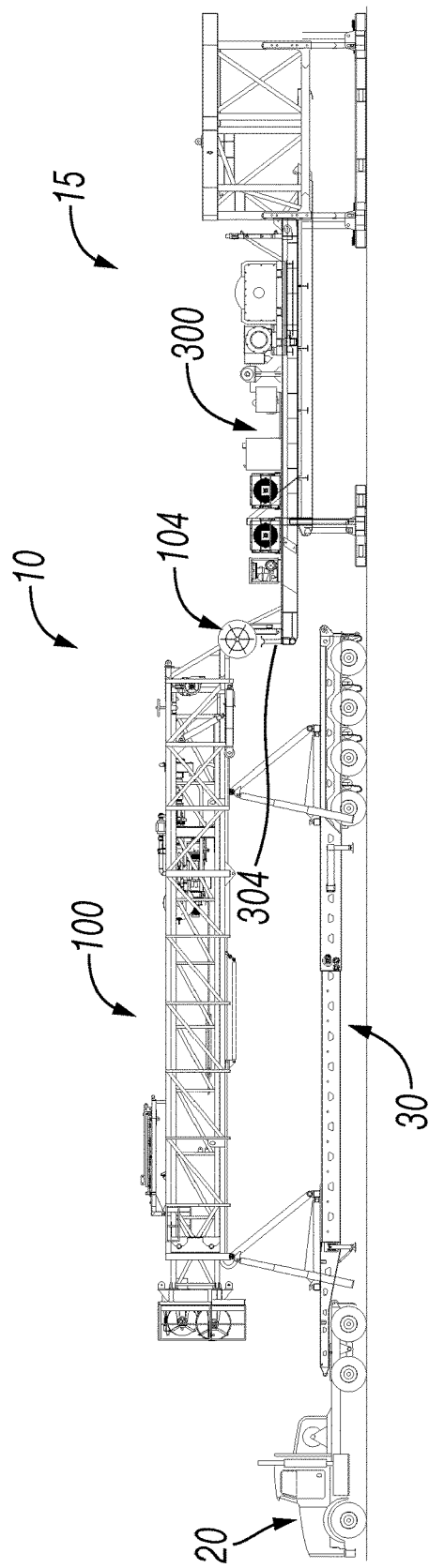
FIG. 3 depicts a drilling rig according to one or more embodiments disclosed herein.

FIG. 3 depicts another embodiment of a process for using a drilling rig with the front bunk 40 and rear bunk 50 holding the mast 100 in an elevated position and to transfer the drilling line spool 104 from the mast 100 to the drawworks skid 300. In FIG. 3 tractor unit 20 backs up the trailer 30 and mast 100 to the drawworks skid 300 until the drilling line spool 104 is in close proximity to the drilling line spool support structure 304 on the drawworks skid 300. In this position, the drilling line spool 104 may be transferred to the drawworks skid 300.

In some embodiments the drilling line spool 104 rotates around a central shaft or pins that extend from either side of the drilling line spool 104. When coupling the drilling line spool 104 to the drilling line spool support structure 304, the central shaft or pins may rest on cradles or other coupling on the drilling line spool support structure 304. In the embodiment shown in FIG. 3 the drilling line spool support structure 304 is coupled to or a part of the drawworks skid 300.

In some embodiments, the drilling line spool support structure 304 may be part of the drilling line spool 104. For example, the drilling line spool 104 may include an attached drilling line spool support structure 304 that travels with the drilling line spool 104. In such an embodiment, when coupling the drilling line spool 104 with an attached drilling line spool support structure 304 to the drawworks skid 300, the drilling line spool 104 may be attached to the drawworks skid by coupling the drilling line spool support structure 304 to the drawworks skid 300.

Figure 4:
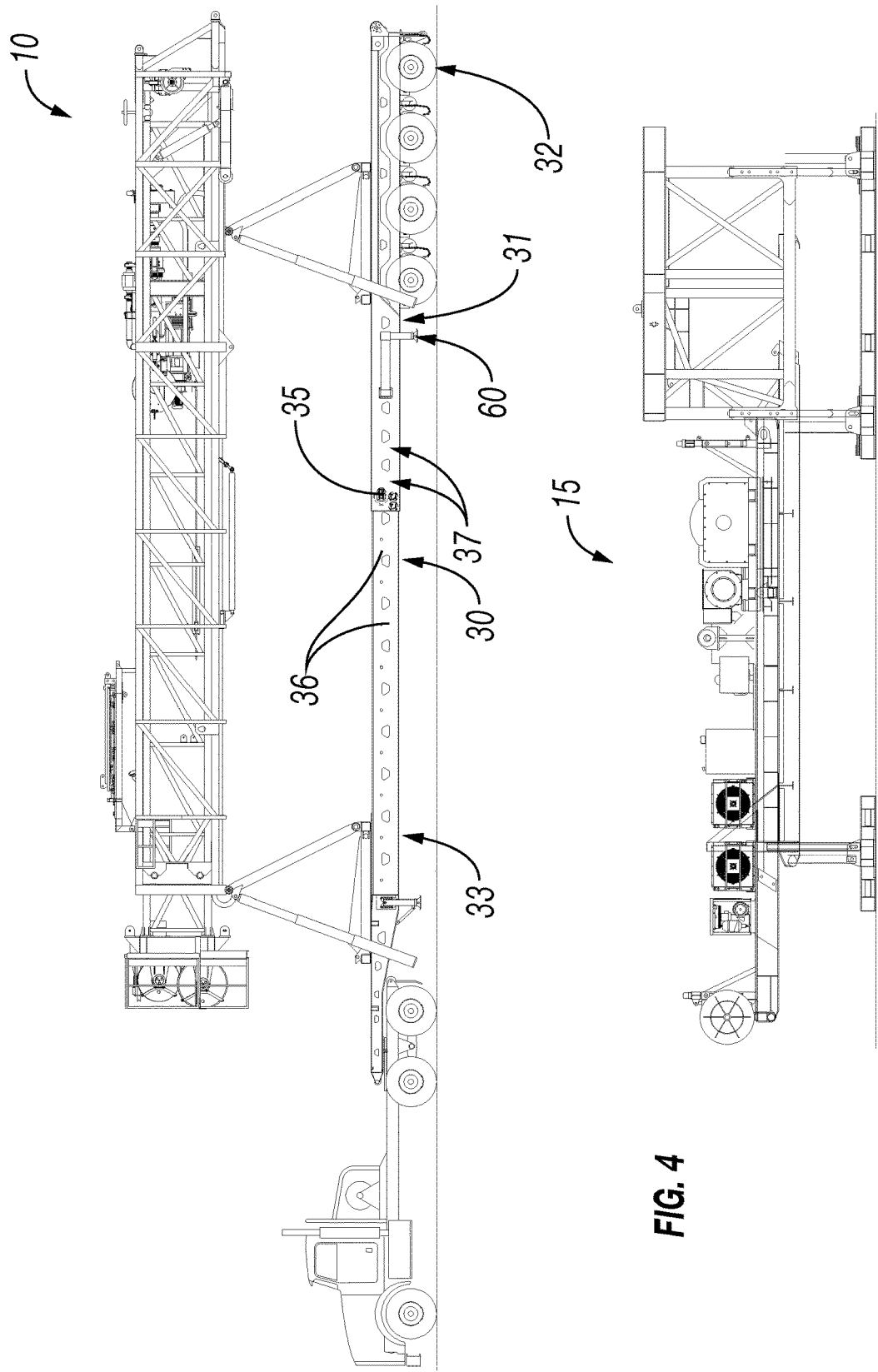
FIG. 4 depicts a drilling rig according to one or more embodiments disclosed herein.

FIG. 4 depicts another embodiment of a process for using a drilling rig. In FIG. 4 the trailer 30 is further prepared for the unloading of the mast 100. As discussed above, a telescoping trailer, such as trailer 30, may include two or more sections, for example, trailer 30 includes a front section 33 and a rear section 31 that are slidingly coupled together. To prevent the front and rear trailer sections 31, 33 from sliding relative to each other during transportation a coupling, for example, the coupling 35, may fixedly couple the front section 33 and the rear section 31 together. In some embodiments, the coupling 35 may include a pin and one or more holes in each of the front and rear trailer sections 31, 33, for example the front section 33 includes holes 36 and the rear section 31 includes a hole 37. To fixedly couple the front section 33 to the rear section 31 a pin is placed through the hole 37 in the rear section 31 and a corresponding one of holes 36 in the front section 33. In FIGS. 1-3 the front and rear trailer sections 31, 33 are depicted as fixedly coupled together. In FIG. 3, an operator may remove the coupling pin, or otherwise disengage the coupling 35, to allow the front and rear trailer sections 31, 33 of the trailer 30 slide relative to each other.

In addition to decoupling the front and rear trailer sections 31, 33 of the trailer 30 from each other, an operator may also lock the axles 32 in the rear section 31 of the trailer 30. By locking the axles 32 the operator prevents the rear section 31 of the trailer 30 from moving relative to the ground when the tractor unit 20 moves forward or backward. This may allow the trailer 30 telescope in and out. In some embodiments the axles 32 are locked by engaging the brakes attached to one or more of the axles 32. In some embodiments, the axles 32 may be locked by placing wheel chocks behind one or more of the wheels associated with the axles 32. In some embodiments, one or more of the axles 32 may include a mechanical lock that prevents rotation of one or more of the axles 32.

One or more front or rear trailer sections 31, 33 may include stabilizer arms 60, as shown in FIG. 4. The stabilizer arms 60 shown in FIG. 4 are attached to the rear trailer section 31. The stabilizer arms 60, shown in a retracted position in FIG. 4, may be operable to extend from the side of the trailer 30 and may include a jack at a distal end of the stabilizer arms 60. The stabilizer arms 60 widen the stance of the trailer and decrease the likelihood of the trailer tipping over during loading and unloading of the mast 100. Without stabilizer arms 60, the trailer 30 may have a stance that is as wide as the trailer's 30 wheel track or the distance between the wheels on the axels 32. A trailer with a wider stance may provide more stability when working with top heavy loads, such as when the mast 100 is raised above the trailer 30 on the front bunk 40 and rear bunk 50.

The stabilizer arms 60 may be deployed or otherwise extended from the side of the trailer 30 at any time during the loading or unloading of the mast 100. In some embodiments, the stabilizer arms 60 are deployed or otherwise extended when the front and rear trailer sections 31, 33 are not fixedly coupled together. In some embodiments, the stabilizer arms 60 may be deployed or otherwise extended and the axles 32 may be locked when the trailer 30 is positioned near the drawworks sled 300 and substructure 200 for transferring the mast 100 to the drilling rig 10, for example as shown in FIG. 5.

Figure 5:
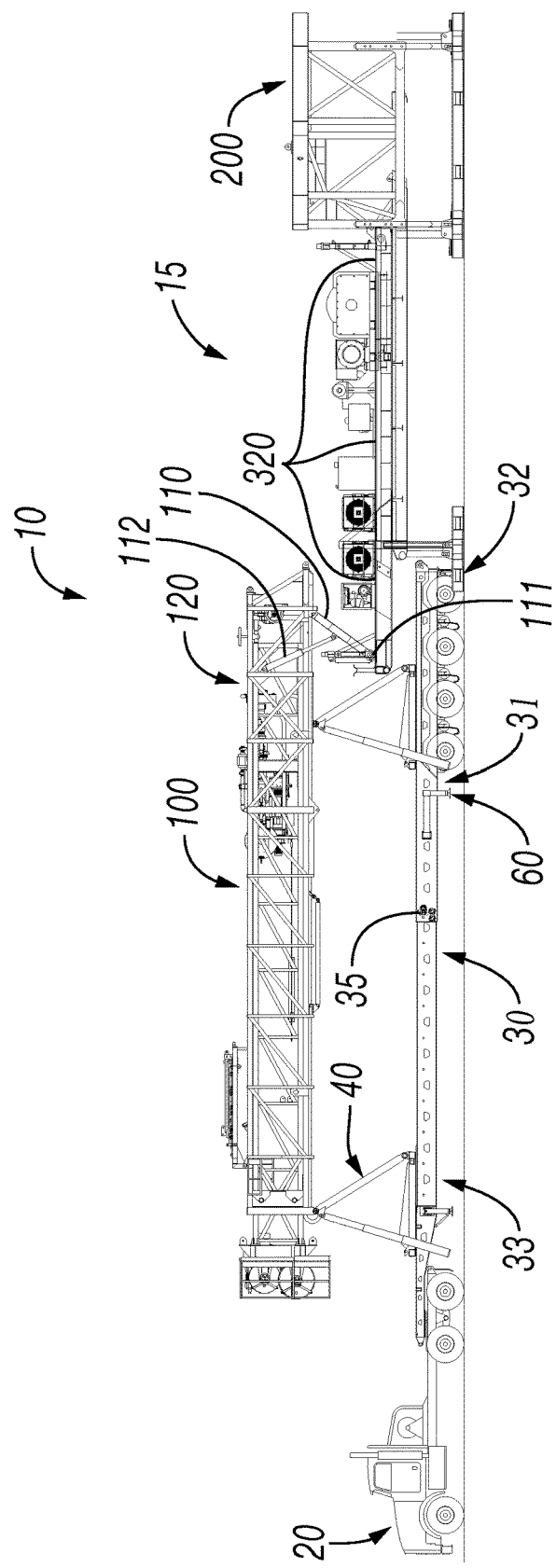
FIG. 5 depicts a drilling rig according to one or more embodiments disclosed herein.

FIG. 5 depicts another embodiment of a process for using a drilling rig. In FIG. 5 the tractor unit 20, has backed the trailer 30 up to the drawworks skid 300 and substructure 200, the axles 32 may also be locked, the coupling 35 may be disengaged such that the front and rear sections 31, 33 of the trailer 30 may move relative to each other, and the stabilizer arms 60 may be deployed, although they are shown in the stowed position in FIG. 5.

In addition, the front bunk 40 and rear bunk 50 may be further adjusted to raise and level the mast 100 and the mast 100 may be shifted laterally to more precisely align the mast with the drilling rig 10. In some embodiments, the trailer, the front bunk 40 and/or rear bunk 50 may include a system for shifting the mast laterally while still attached to the trailer 30. For example, side shifting hydraulic cylinders or a lead screw and nut system or other actuation system may connect the front mast coupling 54 to the rear bunk 50 and may facilitate shifting the mast coupling 54 laterally to align the mast 100 with the drilling rig 10 without using the tractor unit 20 to adjust the alignment.

Figure 11:
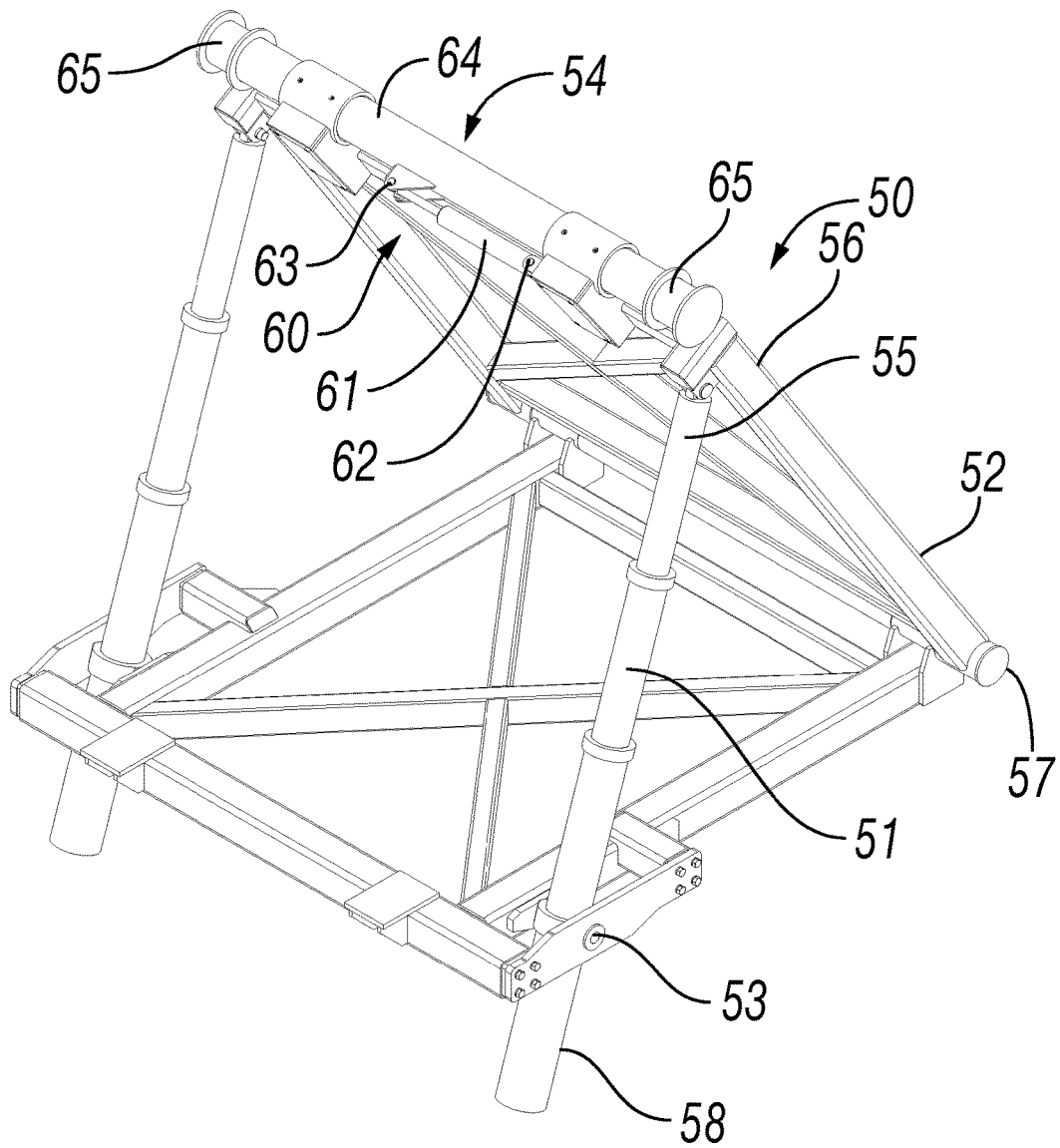
FIG. 11 depicts an illustrative lift according to one or more embodiments disclosed herein.

FIG. 11 depicts a perspective view of the rear bunk 50 shown in FIG. 4. The mast coupling 54 includes a movable member 64. The moveable member 64 may include one or more coupling points 65. For example, coupling points 65 may be part of a saddle clamp coupling, wherein the coupling points 65 are the clamped member while the saddle may be attached to the mast 100 and the bail may clamp the coupling points 65 to the saddle on the mast 100.

The moveable member 64 may shift side to side, or laterally, using a shifting mechanism, for example, the actuator 60. The base 61 or stationary portion of the actuator 60 actuator 60 may be pinned or coupled to the rear bunk 50 at a first or stationary end 62 while the piston or moveable end 63 of the actuator 60 may be pinned or coupled to the moveable member 64. Actuation of the actuator 60 may cause the moveable end 63 of the actuator 60 to move side to side and thereby move the moveable member 64 and coupling points 65.

With the mast 100 aligned with the drilling rig 10 the mast arms 110 may be extended. The mast 100 may include one or more mast arms 110. In some embodiments, the mast 100 includes two mast arms 110, with one mast removal arm 110 coupled or otherwise attached to each side of the mast 100. The mast arms 110 may include actuators 112 to extend and retract the mast arms 110. In some embodiments, the actuators 112 may be hydraulic actuators. In some embodiments, the actuators 112 may be mechanical, electrical, or electro-mechanical actuators and the mast arms 110 may extend and retract manually, for example, through the use of a hand winch, or by use of these or other actuators or actuation systems.

In the embodiment shown in FIG. 5, the mast arms 110 extend and retract through actuation, for example hydraulic actuation. As shown in FIG. 5, the mast arms 110 may include rollers 111 that engage with a track 320 on the drawworks skid 300. The track 320 helps maintain the alignment of and guides the mast 100 as the mast 100 is transferred and assembled onto the drilling rig 10. In some embodiments, the substructure 200 may include the track 320.

Figure 6:
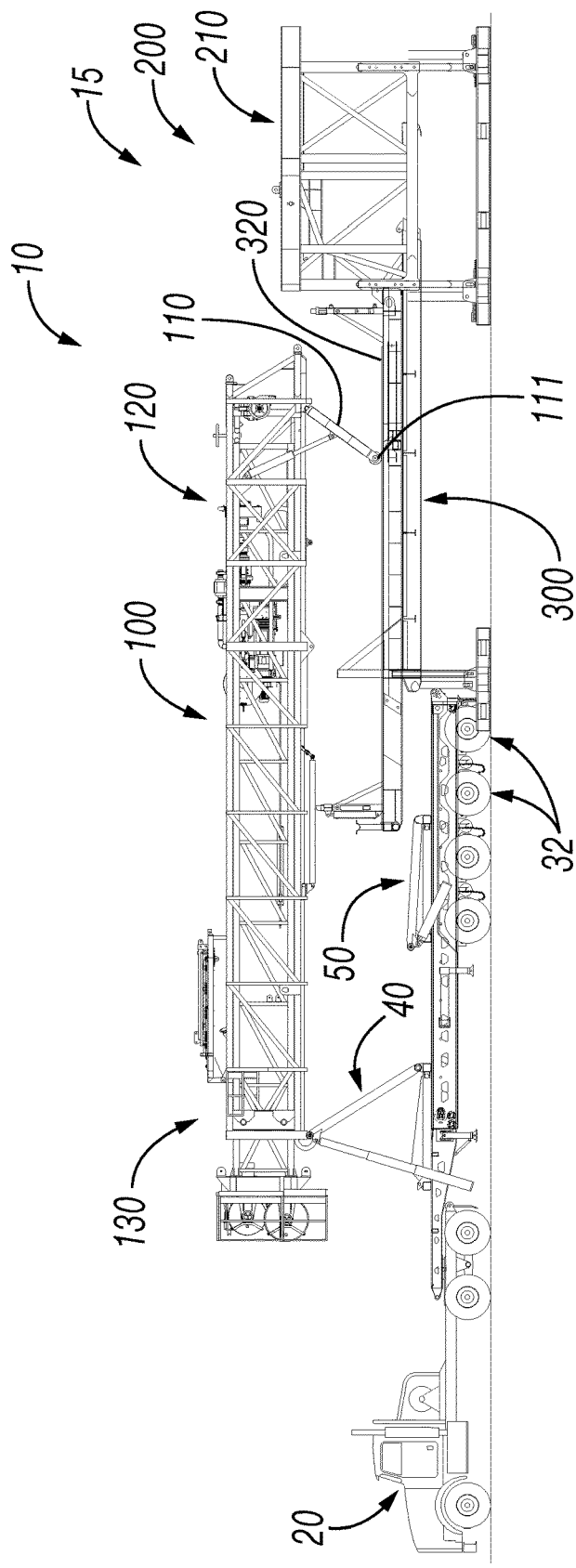
FIG. 6 depicts a drilling rig according to one or more embodiments disclosed herein.

The mast arms 110 may support the weight of the rear end 120 of the mast 100 in addition to and/or in place of the support provided by the rear bunk 50. For example, as shown in FIG. 6, with the rear bunk 50 decoupled from the mast 100 and refracted to a low position, the mast arms support 110 the rear end 120 of the mast on the drawworks skid 300. While the front bunk 40 supports the front end of the mast 100.

Reference to the front end 130 and rear end 120 of the mast 100 is made for convenience and used when discussing the relative front and rear ends 130, 120 of the mast 100, when the mast 100 is in a horizontal position, as shown in FIGS. 1-7. When the mast 100 is in a vertical position the front end 130 becomes the top of the mast 100 and the rear end 120 becomes the bottom of the mast 100.

FIG. 6 depicts another embodiment of a process for assembling a drilling rig. In. FIG. 6 some of the equipment on the drawworks skid 300 has been removed for clarity. As discussed above, the rear bunk 50 is shown in a retracted position while the mast arms 110 support the rear end 120 of the mast 100. In addition, the tractor unit 20 has backed up and moved closer to the drawworks skid 300 and substructure 200. With the front and rear sections 31, 33 of the trailer 30 slidingly coupled to each other and with the axles 32 locked, the trailer is telescoped inward as the tractor unit 20 is backed up. The mast arms 110 have also traveled along the track 320 and are shown in a position closer to the drill floor 210.

Figure 7:
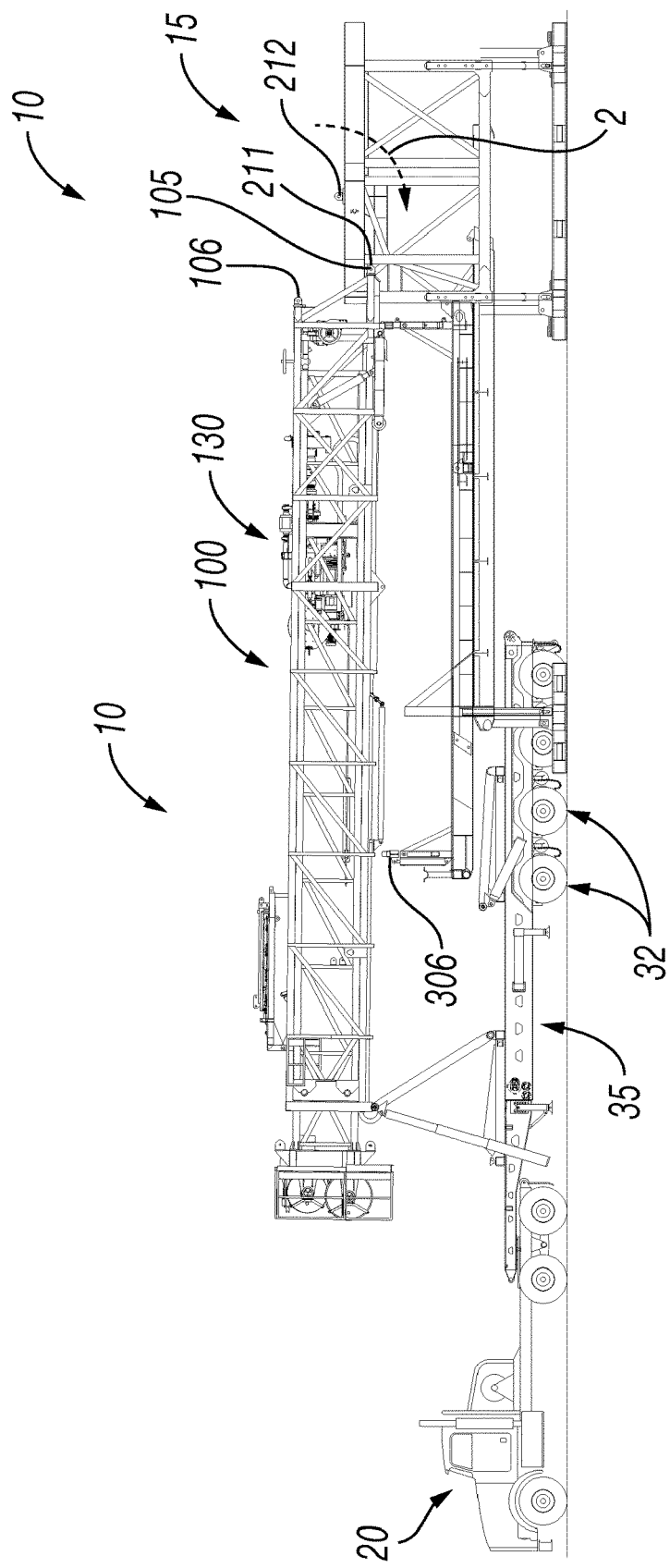
FIG. 7 depicts a drilling rig according to one or more embodiments disclosed herein.

FIG. 7 depicts another embodiment of a process for using a drilling rig. In FIG. 7, the tractor unit 20 may have backed up further and the trailer 30 may be telescoped in further. In this configuration, an operator may pin or otherwise couple the mast 100 to the substructure. In particular, for example, an operator may pin the first mast mount point 105 to the lower mast mount point 211 of the substructure 200. In some embodiments, the lower mast mount 211 may be part of the drawworks skid 300 and the load of the mast 100 may pass through the drawworks skid 300 to the substructure 200. The operator may also retract or otherwise disengage the mast arms 110. With the mast arms retracted or otherwise disengaged, the weight of the rear end 120 of the mast 100 may be supported by the substructure 200 via the mast mount point 211. In some embodiments, the most mount points 105, 211 include multiple couplings.

In the configuration shown in FIG. 7, the mast 100 may be in position to facilitate decoupling and lowering of the front bunk 40. By lowering the front bunk 40, the mast 100 may be lowered onto a mast support, such as mast support member 306. The mast support member 306 may be coupled to the drawworks skid 300, the substructure 200, or another structure.

With the mast 100 no longer supported by the front bunk 40 and rear bunk 50, the tractor unit 20 and trailer 30 may be removed from the drilling rig 10. In some embodiments, the stabilizer arms 60, not shown in FIG. 7, may be retracted or disengaged, the axles 32 may be unlocked, and the coupling 35 may fixedly couple the front section 33 and the rear section 31 together. In such a configuration, the tractor unit 20 may transport an empty trailer 30 to another location.

Figure 8:
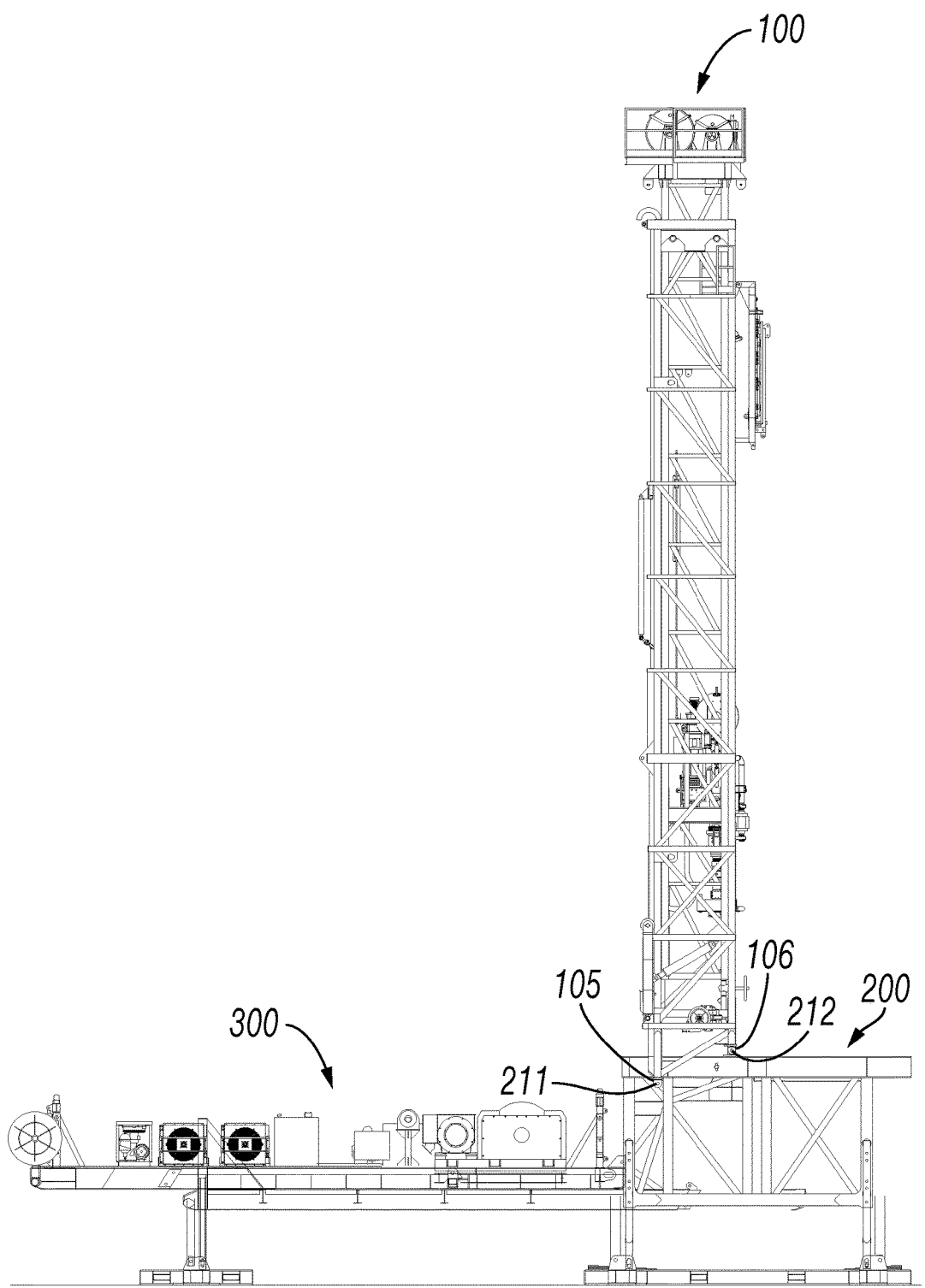
FIG. 8 depicts a drilling rig according to one or more embodiments disclosed herein.

In some embodiments, actuators coupled to the mast 100, for example, at mount point 107, and to the drawworks skid 300 or substructure 200, may push the mast 100 and cause the mast 100 to rotate in a direction 2 and into a vertical position, see FIG. 8. In a vertical position, a second mast mount point 106 may be pinned or otherwise coupled to the mast mount point 212. In some embodiments, the drawworks 310 or other lifting devices may be used to raise the mast 100 into a vertical position.

Figure 9:
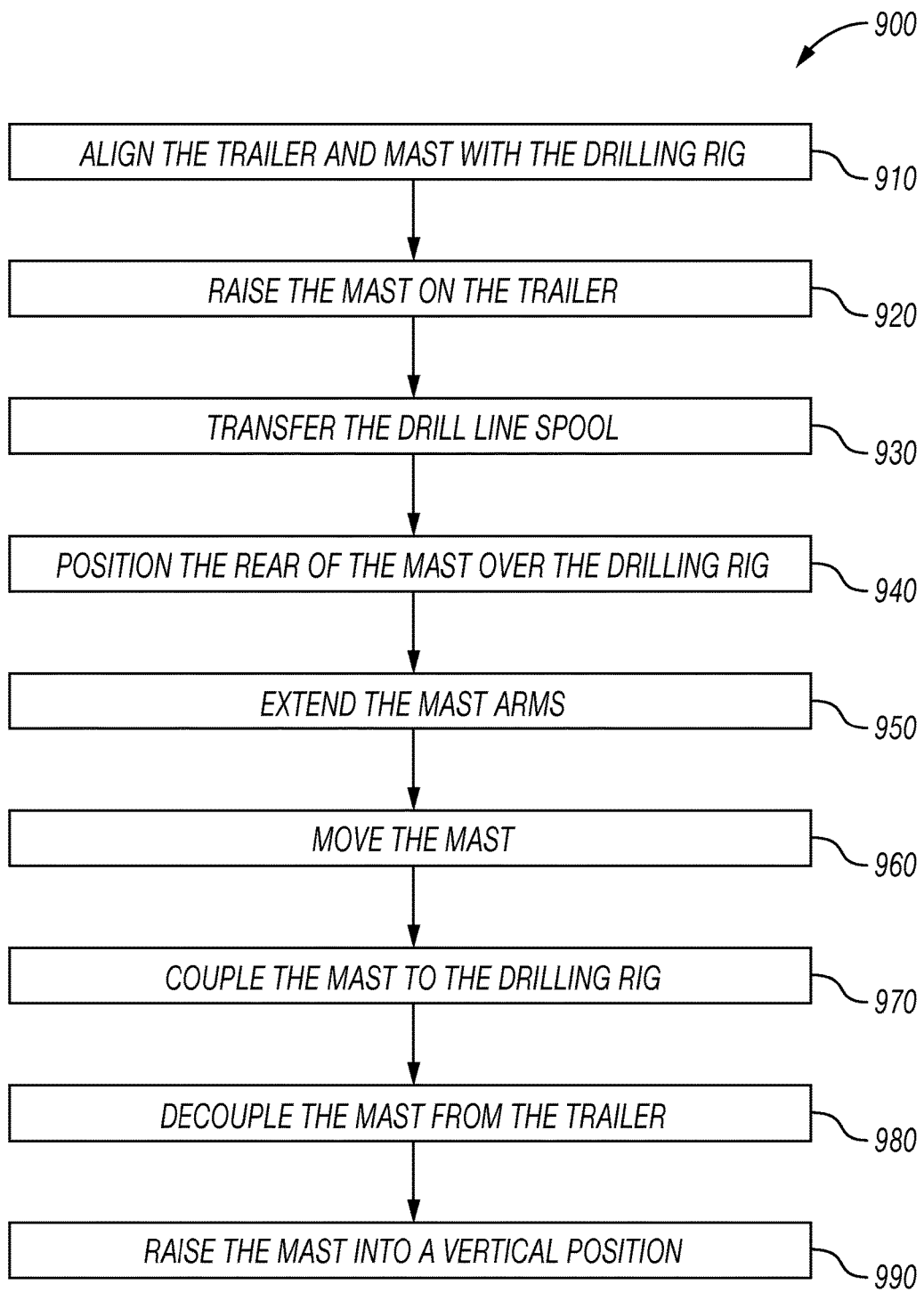
FIG. 9 depicts an illustrative method of assembling a drilling rig according to one or more embodiments disclosed herein.

FIG. 9 shows an embodiment of a method 900 for installing a mast onto a drilling rig. The method 900 for installing a mast onto a drilling rig 10 may include aligning a trailer and mast with the drilling rig, as shown by block 910. In some embodiments, a tractor unit, such as the tractor unit 20, positions and aligns the trailer, such as the trailer 30, and the mast, such as the mast 100 with the drilling rig. Alignment may also include by laterally shifting the mast 100 on the front bunk 40 and/or rear bunk 50, for example by using side shifting hydraulic cylinders or other actuation system.

At block 920 the mast is raised on the trailer. In some embodiments, the trailer may include front and rear bunks, for example, the front bunk 40 and rear bunk 50, as described above. The front bunk 40 and rear bunk 50 may be used to raise the mast 100. In some embodiments, a drilling line spool, such as drilling line spool 104, may be coupled to an end of the mast 100 before the mast 100 is raised. In this way, raising the mast 100 may also raise the drilling line spool 104. Raising the mast on the trailer may also include aligning the trailer 30 with the drilling rig 10 by laterally shifting the mast 100 on the front bunk 40 and/or rear bunk 50, for example by using side shifting hydraulic cylinders.

At block 930 the drilling line spool is transferred. In some embodiments, a drilling line spool 104 is transferred from the trailer 30 or the mast 100 to the drawworks skid, for example the drawworks skid 300, also describe above. In some embodiments, block 930 may also include coupling the drilling line spool 104 to the drawworks skid 300 or the substructure 200.

At block 940 the rear of the mast is positioned over the drilling rig. In some embodiments, positioning the mast over the drilling rig includes causing the tractor unit 20 to move the back of the trailer 30 closer to the drawworks skid 300 and substructure 200 such that the rear end of the mast 100 is over the drawworks skid 300 or substructure 200.

At block 950 the mast arms are extended. In some embodiments, extending the mast arms includes extending or otherwise deploying the mast arms, such as mast arms 110, and engaging the mast arms 110 with a track, such as the track 320 on the drawworks skid 300. This may allow the drawworks skid 300 or the substructure 200 to support an end of the mast 100. In some embodiments, engaging the mast arms 110 with the track 320 includes aligning the rollers 111 at the end of the mast arms 110 with the track 320. In some embodiments, extending the mast arms 110 may also include actuating an actuator to extend the mast arms 110. In some embodiments, the mast arms 110 may be manually actuated, for example with a hand crank.

In some embodiments, the mast arms 110 may not include an actuator or other actuation mechanism and may be coupled to the mast 100. The front bunk 40 and rear bunk 50 may lower the mast 100 until the mast arms 110 engage with the track 320. In some embodiments, the rear bunk 50 may be decoupled from the mast 100 and lowered into a retracted position on the trailer 30.

At block 960 the mast is rolled along the tracks. In some embodiments, rolling the mast 100 along the track 320 may include the tractor unit 20 moving at least a portion of the trailer 30 to cause the mast 100 to move or translate relative to or along a length of the drilling rig support structure 15, the drawworks skid 300 and/or the substructure 200. In some embodiments, the rear section 31 and the front section 33 of the trailer 30 are not fixedly coupled together and may be slidingly coupled to each other to enable the mast 100 to roll along the track 320. In some embodiments, one or more of the axles 32 may be locked to enable the mast 100 to roll along the track 320. In some embodiments, the trailer 30 may telescope inward while the mast 100 rolls along the track 320. In some embodiments, the mast 100 rolls along the track 320 on the mast arms 110 until mast mount point on the mast 100 aligns with a mast mount point on the substructure 200, for example, until the mast mount point 105 on the mast 100 aligns with the mast mount point 211 on the substructure 200.

At block 970 the mast is coupled to the drilling rig. In some embodiments, the mast 100 is coupled to the drilling rig 10 by coupling the mast mount point 105 on the mast 100 with the mast mount point 211 on the substructure 200. In some embodiments, the coupling is accomplished by inserting a pin through holes or apertures in the mast mount points 105, 211. A pin and aperture coupling may allow the mast 100 to be rotatably coupled to the drilling rig 10.

At block 980 the mast is decoupled from the trailer. In some embodiments, the front mast coupling 44 may be a pin and aperture assembly. For example, the mast 100 may have an aperture that corresponds to an aperture in the front bunk 40 and a pin may be placed through both apertures to couple the mast 100 to the front bunk 40. In some embodiments, to decouple the mast 100 from the trailer 30, a pin is removed from the apertures in the front bunk 40 and the mast 100. In some embodiments, for example, when the mast coupling 44 is a king pin and turntable hitch, the trailer 30 may be moved to disengage the turntable hitch attached to the front bunk 40 from the king pin attached to the mast 100 and thereby decouple the front bunk 40 from the mast 100. In some embodiments, when the trailer 30 and mast 100 are decoupled, the tractor unit 20 may transport the trailer 30 away from the drilling rig 10.

At block 990 the mast is raised into a vertical position. In some embodiments, raising the mast 100 into a vertical position includes coupling the mast to the drawworks 310 and activating the drawworks 310 to pull the mast 100 into a vertical position. In some embodiments, moving the mast 100 into a vertical position includes coupling an actuator between the mast 100 and the substructure 200 or the drawworks skid 300 and actuating or otherwise extending the actuator to translate the mast 100 from a horizontal position to a vertical position. In some embodiments, in a vertical position a second mast mount point 106 on the mast 100 is coupled to a second mast mount point 212 on the substructure 200 and the mast 100 may also be further secured by guy wires, not shown, to maintain the mast 100 in a vertical position.

Figure 10:
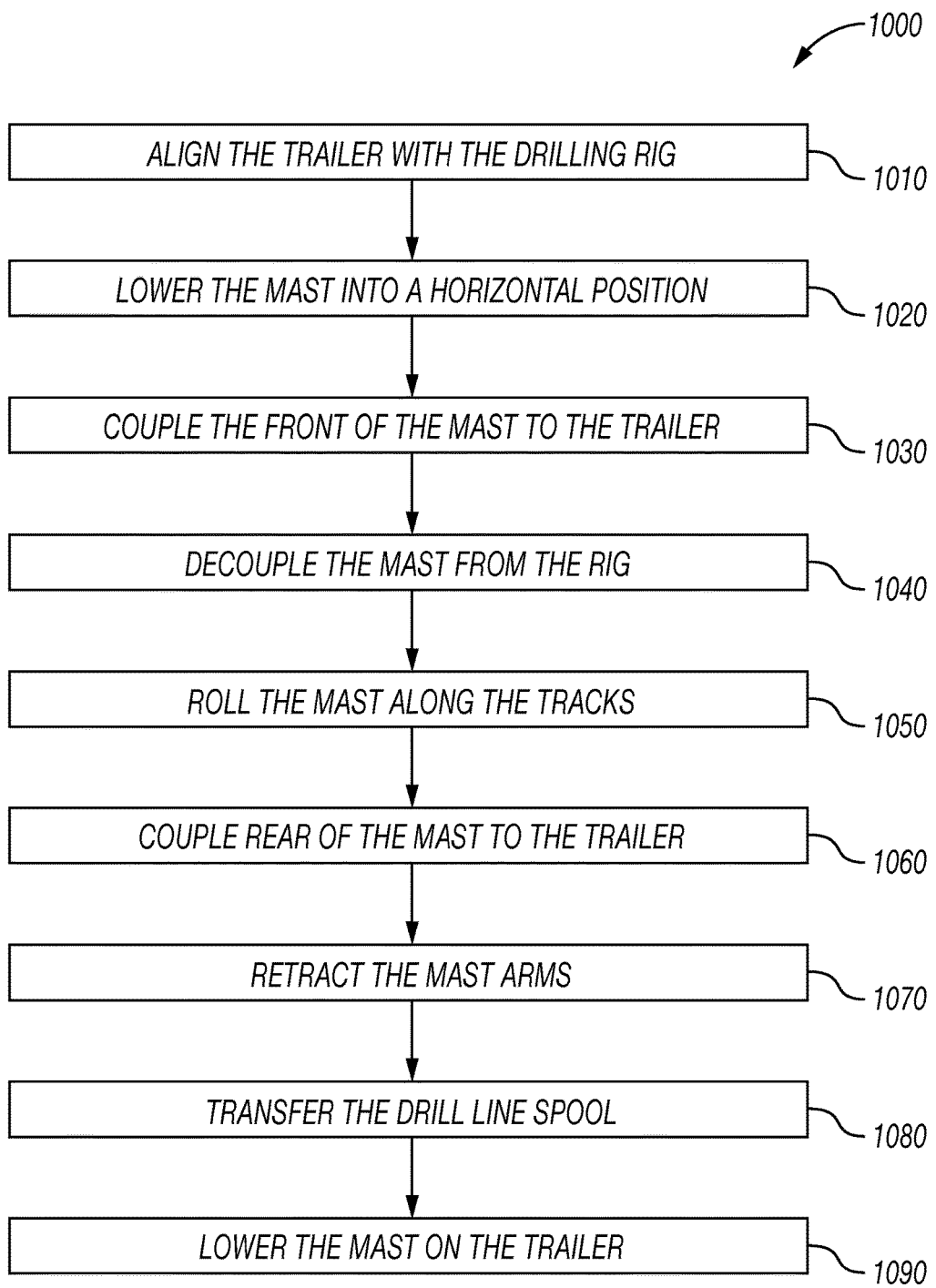
FIG. 10 depicts an illustrative method of disassembling a drilling rig according to one or more embodiments disclosed herein.

In some embodiments, removing the mast 100 from the drilling rig 10 may include practicing the above described assembly process in a different order, for example by reversing the process or portions of the process, as will be readily understood by a person of skill in the art. But, more particularly, FIG. 10 shows an embodiment of a method 1000 for removing a mast from a drilling rig. The method 1000 for removing a mast from a drilling rig may include aligning a trailer 30 with the drilling rig 10, as shown by block 1010. In some embodiments, a tractor unit, such as the tractor unit 20, positions and aligns the trailer 30, with the drilling rig 10.

At block 1020 the mast is lowered into a horizontal position. In some embodiments, lowering the mast 100 into a horizontal position includes disconnecting the second mast mount point 106 on the mast 100 from the second mast mount 212 on the substructure 200 and may also include disconnecting one or more guy wires. In some embodiments, the drawworks 310 lowers the mast 100 into a horizontal position. In some embodiments, moving the mast 100 into a horizontal position includes coupling an actuator between the mast 100 and the substructure 200 or the drawworks skid 300 and actuating or otherwise retracting the actuator to translate the mast 100 from a vertical position to a horizontal position.

At block 1030 the front of the mast is coupled to the trailer. In some embodiments, the mast 100 may be coupled to the trailer 30 through the front bunk 40 and rear bunk 50. For example, the front end 130 of mast 100 may be attached to the trailer via mast coupling 44 by raising the front bunk 40. In some embodiments, where the mast coupling 44 is a pin and aperture assembly, the mast 100 is coupled to the trailer 30 by placing a pin through apertures in the mast 100 and the front bunk 40. In some embodiments, for example, where the mast coupling 44 is a king pin and turntable hitch, the trailer 30 is moved such that the turntable hitch on the front bunk 40 engages with a king pin on the mast 100, thereby coupling the mast 100 to the trailer 30.

At block 1040 the mast is decoupled from the drilling rig. In some embodiments, the mast 100 is decoupled from the drilling rig 10 by decoupling the mast mount point 105 on the mast 100 from the mast mount point 211 in the substructure 200. In some embodiments, a pin is removed from the holes or apertures included in the mast mount points 105, 211 to decouple the mast 100 from the drilling rig 10.

At block 1050 a mast is moved. In some embodiments, the mast 100 may be moved or translate along tracks, for example tracks 320. In some embodiments, moving the mast 100 may include the tractor unit 20 moving at least a portion of the trailer 30 to cause the mast 100 to move relative to the drawworks skid 300 or the substructure 200. In some embodiments, the rear section 31 and the front section 33 of the trailer 30 are not fixedly coupled together and may be slidingly coupled to each other to enable the mast 100 to roll along the track 320. In some embodiments, one or more of the axles 32 may be locked to enable the mast 100 to roll along the track 320. In some embodiments, the trailer 30 may telescope outward while the mast 100 rolls along the track 320. In some embodiments, the mast 100 rolls along the track 320 on the mast arms 110 until the mast arm nears an end of the track 320 opposite the drill floor 210 or until the rear mast coupling 54 is clear of the drawworks skid 300 and substructure 200 such that raising the rear bunk 50 will allow the rear bunk 50 to engage with the mast coupling 54 on the mast 100.

At block 1060 the rear of the mast is coupled to the trailer. In some embodiments, the rear bunk 50 is raised or extended and the trailer 30 positioned such that the rear bunk 50 aligns with the rear mast coupling 54 and the mast may then be coupled to the trailer 30. In some embodiments, the mast coupling 54 may be a pin and aperture assembly and the mast 100 is coupled to the trailer 30 by placing a pin through the apertures in the mast 100 and the rear bunk 50.

At block 1070 the mast arms are retracted. In some embodiments, retracting the mast arms 110 includes retracting mast arms 110, and disengaging the mast arms 110 from the track 320. In some embodiments, disengaging the mast arms 110 may also include actuating an actuator to retract the mast arms 110. In some embodiments, the mast arms 110 may be manually actuated with a hand crank, hydraulically actuated, or actuated by other actuation devices or systems.

In some embodiments, the mast arms may not include an actuator or other actuation mechanism and may be coupled to the mast 100. In such embodiments, the front bunk 40 and rear bunk 50 may raise the mast 100 until the mast arms 110 disengage from the track 320. When the mast arms 110 no longer support the weight of the mast 100, the mast arms 110 may be removed from or otherwise decoupled from the mast 100.

At block 1080 the drilling line spool is transferred. In some embodiments, a drilling line spool, such as the drilling line spool 104 described above, is transferred from the drawworks skid 300 to the mast 100 or the trailer 30. In some embodiments, block 1080 may also include coupling the drilling line spool 104 to the mast 100.

At block 1090 the mast is lowered on the trailer. In some embodiments, the trailer 30 may include front bunk 40 and rear bunk 50, as described above. The front bunk 40 and rear bunk 50 may be used to lower the mast 100. In some embodiments, the drilling line spool 104 may be coupled to an end of the mast 100 while the mast 100 is lowered. In this way, lowering the mast 100 may also lower the drilling line spool 104. Lowering the mast 100 on the trailer 30 may also include securing the drilling line spool 104 to the trailer.

A few example embodiments have been described in detail above; however, those skilled in the art will readily appreciate that many modifications are possible in the example embodiments without materially departing from the scope of the present disclosure or the appended claims. Accordingly, such modifications are intended to be included in the scope of this disclosure. Likewise, while the disclosure herein contains many specifics, these specifics should not be construed as limiting the scope of the disclosure or of any of the appended claims, but merely as providing information pertinent to one or more specific embodiments that may fall within the scope of the disclosure and the appended claims. Any described features from the various embodiments disclosed may be employed in combination. In addition, other embodiments of the present disclosure may also be devised which lie within the scope of the disclosure and the appended claims. Additions, deletions and modifications to the embodiments that fall within the meaning and scopes of the claims are to be embraced by the claims.

Certain embodiments and features may have been described using a set of numerical upper limits and a set of numerical lower limits. It should be appreciated that ranges including the combination of any two values, e.g., the combination of any lower value with any upper value, the combination of any two lower values, or the combination of any two upper values are contemplated. Certain lower limits, upper limits and ranges may appear in one or more claims below. Numerical values are "about" or "approximately" the indicated value, and take into account experimental error, tolerances in manufacturing or operational processes, and other variations that would be expected by a person having ordinary skill in the art.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include other possible embodiments along with the full scope of equivalents to which such claims are entitled. Accordingly, the claims are not limited by the disclosure.

What is claimed is:

1. A method of assembling a drilling rig, comprising:
   aligning a trailer with a drilling rig support structure, the trailer including a mast thereon and the drilling rig support structure including a step-down substructure;
   positioning a first end of the mast over the drilling rig support structure;
   supporting the mast on the drilling rig support structure with mast arms;
   translating the mast along a length of the drilling rig support structure; and
   coupling the mast to the drilling rig support structure,
   wherein translating the mast along a length of the drilling rig support structure, comprises:
   extending the mast arms from the mast to the drilling rig support structure, the mast arms engaging with a track and a drawworks skid; and
   supporting the first end of the mast on the drawworks skid.

2. The method of claim 1, wherein positioning the first end of the mast over the drilling rig support structure comprises:
   actuating a lift to raise the first end of the mast to a height greater the a height of the drilling rig support structure; and
   moving the trailer such that the first end of the mast moves to a position above the drilling rig support structure.

3. A method of assembling a drilling rig, comprising:
   aligning a trailer with a drilling rig support structure, the trailer including a mast thereon and the drilling rig support structure including a step-down substructure;
   positioning a first end of the mast over the drilling rig support structure;
   supporting the mast on the drilling rig support structure with mast arms;
   translating the mast along a length of the drilling rig support structure;
   coupling the mast to the drilling rig support structure;
   disengaging a first coupling between a front section of the trailer and a rear section of the trailer to slidingly engage the front section of the trailer with the rear section of the trailer; and
   locking a rear axle of the trailer, the locked rear axle resisting movement of the trailer.

4. The method of claim 3, wherein translating the mast along a length of the drilling rig support structure comprises:
   translating a tractor unit coupled to the trailer with the mast thereon, the translation of the tractor unit causing the mast to translate along the length of the drilling rig support structure.

5. A method of assembling a drilling rig, comprising:
   aligning a trailer with a drilling rig support structure, the trailer including a mast thereon and the drilling rig support structure including a step-down substructure;
   positioning a first end of the mast over the drilling rig support structure;
   supporting the mast on the drilling rig support structure with mast arms;
   translating the mast along a length of the drilling rig support structure; and
   coupling the mast to the drilling rig support structure;
   coupling a drilling line spool to the mast;
   raising the drilling line spool by raising the mast; and
   transferring the drilling line spool from the mast to the drilling rig support structure.

6. A method of assembling a drilling rig, comprising:
   aligning a trailer with a drilling rig support structure, the trailer including a mast thereon and the drilling rig support structure including a step-down substructure;
   positioning a first end of the mast over the drilling rig support structure;

supporting the mast on the drilling rig support structure with mast arms;
translating the mast along a length of the drilling rig support structure; and
coupling the mast to the drilling rig support structure, wherein coupling the mast to the drilling rig support structure comprises coupling a first mast mount point of the mast to a first mast mount on a drawworks skid.

7. A method of assembling a drilling rig, comprising:
aligning a trailer with a drilling rig support structure, the trailer including a mast thereon and the drilling rig support structure including a step-down substructure;
positioning a first end of the mast over the drilling rig support structure;
supporting the mast on the drilling rig support structure with mast arms;
translating the mast along a length of the drilling rig support structure; and
coupling the mast to the drilling rig support structure,
wherein translating the mast along a length of the drilling rig support structure comprises:
supporting the first end of the mast on a track of the drawworks skid with the mast arms; and
translating the mast while supporting the first end of the mast on the track of the drawworks skid.

* * * * *